(12) United States Patent
Kaneda

(10) Patent No.: US 6,204,890 B1
(45) Date of Patent: Mar. 20, 2001

(54) NOISE REDUCER USING MEMORY

(75) Inventor: Kitahiro Kaneda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/881,951

(22) Filed: Jun. 25, 1997

(30) Foreign Application Priority Data

Jul. 5, 1996 (JP) .................................................. 8-176431

(51) Int. Cl.$^7$ ............................. H04N 5/21; H04N 5/213
(52) U.S. Cl. .................... 348/607; 348/606; 348/618; 348/622; 386/21; 386/113
(58) Field of Search .................. 348/606, 607, 348/618, 619, 614, 622, 624, 612, 617, 630, 631, 616; 386/21, 113, 114, 116; 382/375

(56) References Cited

U.S. PATENT DOCUMENTS

| | | | | |
|---|---|---|---|---|
| 5,119,195 | * | 6/1992 | Christopher | 348/623 |
| 5,268,760 | * | 12/1993 | Suyama | 348/624 |
| 5,367,340 | * | 11/1994 | Spencer | 348/607 |
| 5,519,454 | * | 5/1996 | Willis | 348/663 |
| 5,574,512 | * | 11/1996 | Saeger | 348/620 |
| 5,600,380 | * | 2/1997 | Patel et al. | 348/614 |
| 5,621,474 | * | 4/1997 | Mancuso et al. | 348/606 |
| 5,654,766 | * | 8/1997 | McNay | 348/614 |
| 5,822,011 | * | 10/1998 | Rumreich | 348/549 |

\* cited by examiner

Primary Examiner—Mark R. Powell
Assistant Examiner—Wesner Sajous
(74) Attorney, Agent, or Firm—Robin, Blecker & Daley

(57) ABSTRACT

A noise reducer which applies a time-cyclic type of noise reproduction processing to only a predetermined image signal in an input image signal in the case of applying the time-cyclic of noise reduction processing to the input image signal by using a memory.

26 Claims, 6 Drawing Sheets

INPUT PIXELS
(INCLUDING BOTH NR AND TRU)

● = TRU
○ = NR $$A = \frac{|C - C{-}1| + |C{+}1 - C|}{2}$$

WHEN $A < TH$, $A =$ NOISE COMPONENT $(N = A)$ ⇒ $Y(\text{OUTPUT}) = C - A$

WHEN $A > TH$, $LIM =$ NOISE COMPONENT $(N = LIM)$ ⇒ $Y(\text{OUTPUT}) = C - LIM$ $$A = \frac{|C-C1| + |C-C2| + |C-C3| + |C-C4|}{4}$$

ns filter shown in FIG. 1;
NOISE REDUCER USING MEMORY

BACKGROUND OF THE INVENTION

1. Field of the Invention

The present invention relates to a noise reducer and, more particularly, to noise reduction using a memory.

2. Description of Related Art

Various kinds of noise reducers (hereinafter referred to as NR circuits) for reducing a noise component of an input signal have heretofore been considered.

A particular kind of NR circuit using a memory, i.e., a so-called time-cyclic NR circuit, is widely used in a recent type of image processing apparatus as an NR circuit for an image signal because its effect is large in spite of its simple algorithm.

However, this kind of NR circuit needs a memory in principle, and the more the number of pixels of an image signal to be handled, the larger the required capacity of the memory.

For example, in recent years, there have been proposed a system which processes a high-definition video signal the number of pixels of which is approximately twice the number of pixels of an NTSC video signal, i.e., a so-called HD video signal, and a system using a progressive scanning type of image pickup element which outputs an image signal for one frame per 1/60 of a second instead of a conventional interlaced scanning type of image pickup element which outputs an image signal for one frame per 1/30 of a second.

In the above-described systems, to realize the aforesaid NR circuit, it is necessary to use a memory having a capacity which is approximately twice or more times the memory capacity of the system using the interlaced scanning type of image pickup element.

BRIEF SUMMARY OF THE INVENTION

It is, therefore, an object of the present invention to solve the above-described problems.

Another object of the present invention is to make it possible to effectively reduce noise in a signal by means of a simple and inexpensive arrangement.

Another object of the present invention is to make it possible to effectively reduce noise even in a system using a progressive scanning type of image pickup element without increasing the required circuit scale.

To achieve the above-described objects, according to one aspect of the present invention, there is provided an image signal processing apparatus which comprises separating means for separating an input image signal into a first image signal and a second image signal, noise reducing means having a memory and arranged to apply noise reduction processing to the first image signal by using the memory, and combining means for combining the first image signal processed by the noise reducing means and the second image signal.

The above and other objects, features and advantages of the present invention will become apparent from the following detailed description of an embodiment of the present invention, taken in conjunction with the accompanying drawings.

DETAILED DESCRIPTION OF THE INVENTION

An embodiment of the present invention will be described below in detail with reference to the accompanying drawings.

Figure 1:
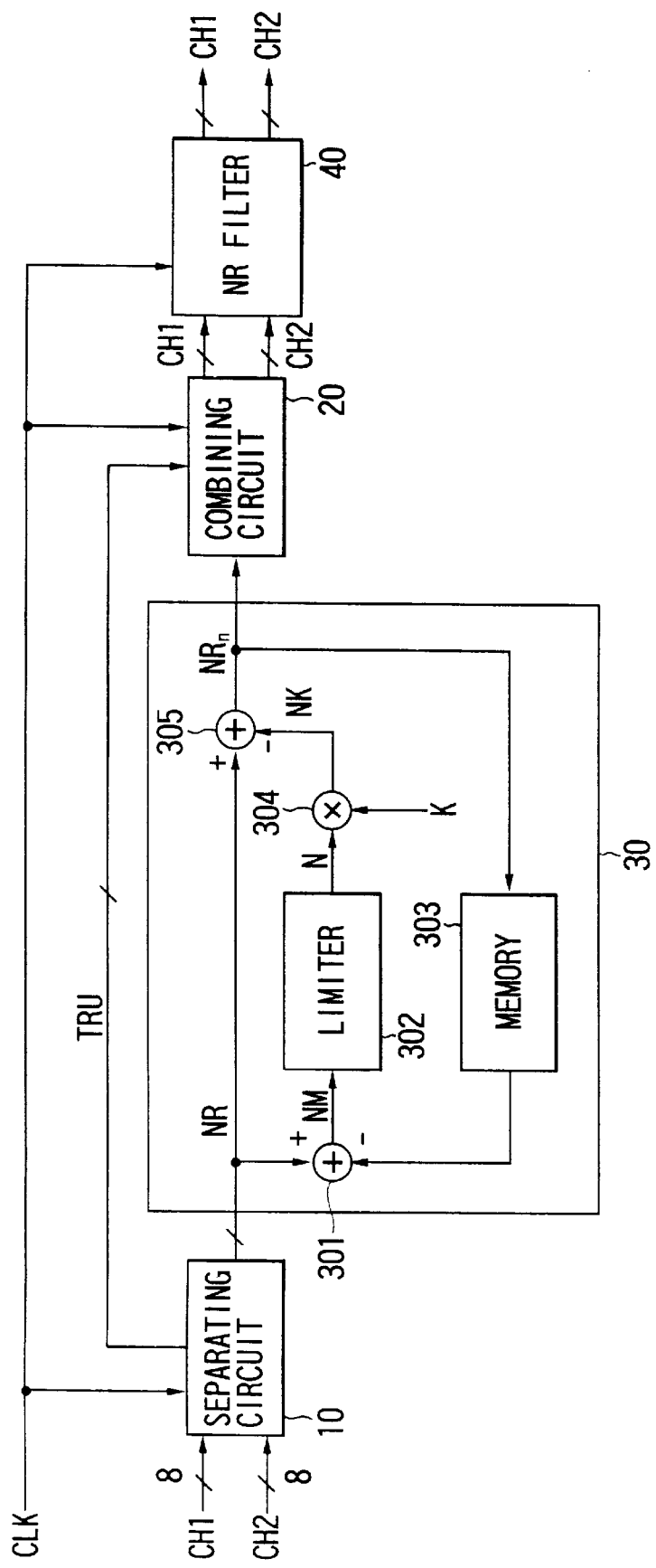
FIG. 1 is a block diagram showing the arrangement of a signal processing apparatus according to an embodiment of the present invention.

FIG. 1 is a block diagram showing the arrangement of a signal processing apparatus according to the embodiment of the present invention.

In the following description of the present embodiment, reference will be made to a case in which an image signal outputted from an image pickup part which uses a progressive scanning type of image pickup element which outputs an image signal for one frame per 1/60 of a second as described above is inputted to the signal processing apparatus and the noise component contained in the image signal is reduced by the signal processing apparatus.

The image pickup part which uses the progressive scanning type of image pickup element may employ the matter disclosed in Japanese Patent Application No. Hei 7-280879.

Referring to FIG. 1, the image signal on each odd line in the image signal for one frame obtained from the progressive scanning type of image pickup element is inputted to a separating circuit 10 through a channel CH1, while the image signal on each even line in the same image signal is inputted to the separating circuit 10 through a channel CH2. The image signals through these two channels CH1 and CH2 are inputted to the separating circuit 10 in parallel, and each of the image signals is a digital signal of 8 bits per pixel (sample).

The separating circuit 10 separates, in accordance with a pixel clock CLK, the image signals which have been inputted in parallel from the two channels CH1 and CH2 into a signal (pixel) to be subjected to NR processing in an NR circuit 30 as will be described later and a signal (pixel) not to be subjected to NR processing. The signal not to be subjected to NR processing (hereinafter referred to as the signal TRU) is outputted to a combining circuit 20, while the signal to be subjected to NR processing (hereinafter referred to as the signal NR) is outputted to the NR circuit 30.

The NR circuit 30 is a time-cyclic NR circuit, and the signal NR outputted from the separating circuit 10 is supplied to adders 301 and 305.

The adder 301 subtracts a signal $NR_{n-1}$ stored in a memory 303 from the input signal NR and obtains a difference signal NM (Noise and Motion). The signal $NR_{n-1}$ precedes the signal NR by a one-field period (1/60 of a second) and is already subjected to noise reduction processing. The difference signal NM includes the motion component between the input image signal and the image signal stored in the memory 303, and the noise component of the input image signal. The difference signal NM is supplied to a limiter 302. If the difference signal NM has a value not greater than a threshold, the limiter 302 outputs the difference signal NM without modification. If the difference signal NM has a value greater than the threshold, the limiter 302 reduces the value of the difference signal NM to the threshold and extracts a pure noise component N and outputs it to a multiplier 304.

The multiplier 304 multiplies the noise component N by an appropriate coefficient K and obtains a final noise component NK. The adder 305 subtracts the final noise component NK from the signal NR outputted from the separating circuit 10 and obtains a signal $NR_n$ whose noise component is reduced. The signal $NR_n$ is outputted to the combining circuit 20 and the memory 303.

The combining circuit 20 combines the signal $NR_n$ and the signal TRU separated by the separating circuit 10 in a manner which will be described later, and outputs the combined signal to an NR filter 40. The NR filter 40 applies noise reduction processing using filtering to the signal not subjected to noise reduction processing in the NR circuit 30, i.e., the one of the signals on both channels CH1 and CH2 which corresponds to the signal TRU, in a manner which will be described later, and outputs the obtained image signals to the two channels CH1 and CH2.

The separating circuit 10 and the combining circuit 20 will be described below.

Figure 2:
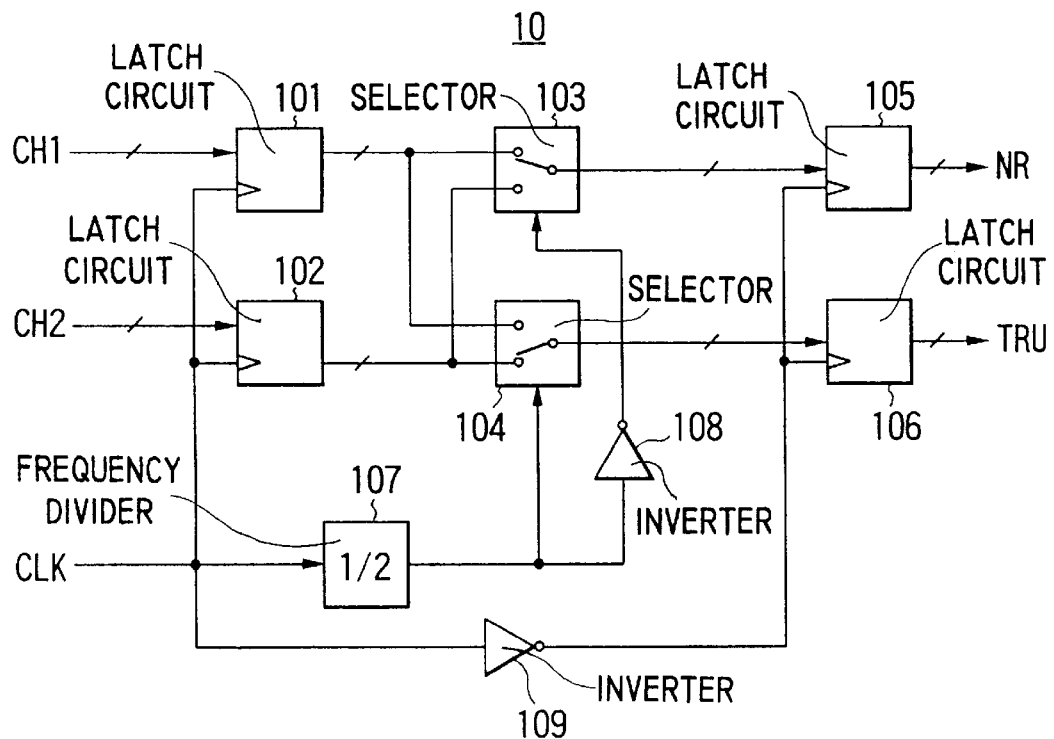
FIG. 2 is a block diagram showing the arrangement of the separating circuit shown in FIG. 1.

FIG. 2 is a block diagram showing the arrangement of the separating circuit 10.

Referring to FIG. 2, the input image signals on the channels CH1 and CH2 are respectively latched by latch circuits 101 and 102 (all latch circuits are indicated as LC in FIGS. 2, 3 and 6) on a pixel-by-pixel basis in accordance with the pixel clock CLK. The latched data are respectively supplied to two selectors 103 and 104 (all selectors are indicated as SE in FIGS. 2, 3 and 6). Operating clocks for the selectors 103 and 104 are obtained by converting the pixel clock CLK synchronized with the input image signal into a clock having a frequency of one-half of that of the pixel clock CLK by means of a frequency divider 107 (all frequency dividers are indicated as FD in FIGS. 2, 3 and 6). The operating clock for the selector 103 is obtained by inverting the phase of the clock having the frequency of one-half of that of the pixel clock CLK by means of an inverter 108 (all inverters are indicated as I in FIGS. 2, 3 and 6).

The output data of the selectors 103 and 104 are respectively latched by latch circuits 105 and 106 in accordance with a clock obtained by inverting the pixel clock CLK by means of an inverter 109, and the signals NR and TRU are outputted from the latch circuits 105 and 106.

Figure 3:
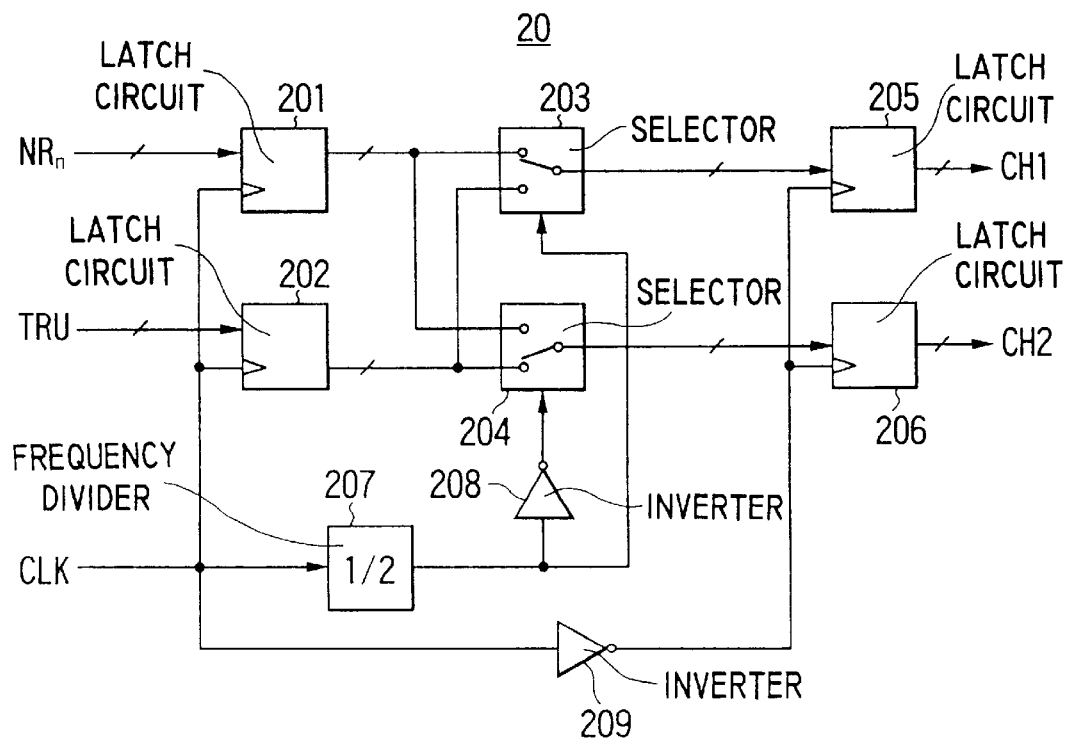
FIG. 3 is a block diagram showing the arrangement of the combining circuit shown in FIG. 1.

FIG. 3 is a block diagram showing the arrangement of the combining circuit 20. The combining circuit 20 performs processing similar to that of the separating circuit 10 shown in FIG. 2 except that the phase relationship between selectors 203 and 204 is opposite to the phase relationship between the selectors 103 and 104. Thus, the combining circuit 20 restores the noise-reduced signal $NR_n$ and the signal TRU into the original two-channel image signals.

Figure 4A:
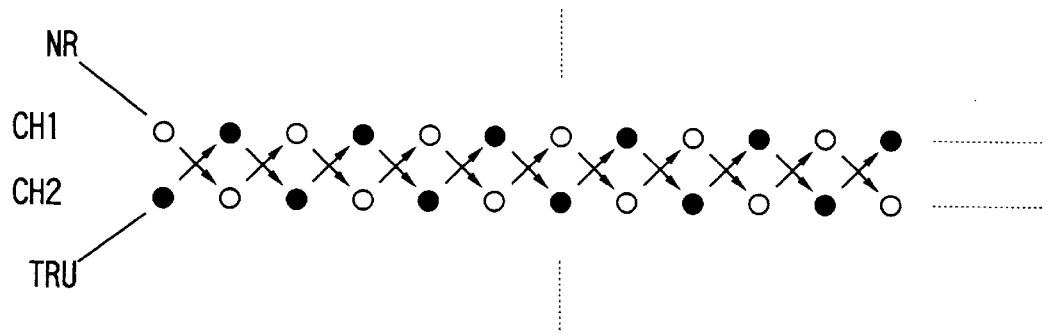
FIGS. 4(a) and 4(b) are views aiding in explaining the operation of the circuit shown in FIG. 2.
Figure 4B:
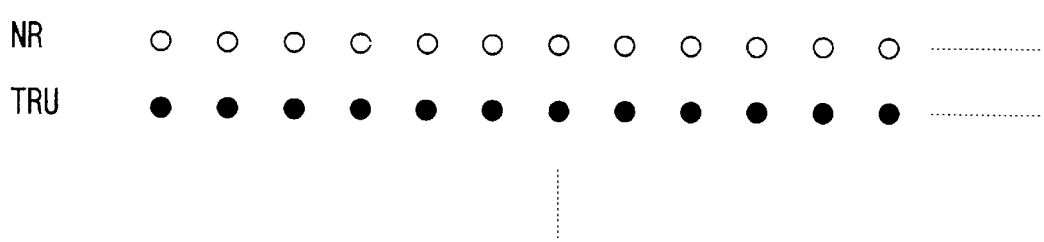

Through the aforesaid separation performed by the separating circuit 10, the signals NR and TRU are sampled in a pattern staggered with respect to the original signals CH1 and CH2 as shown in FIG. 4(a), and are outputted as shown in FIG. 4(b).

In other words, in the present embodiment, the input image signal is separated into the signals NR and TRU by the separating circuit 10, and only the signal NR is subjected to the time-cyclic noise reduction processing using the memory 303 in the NR circuit 30, so that only an image signal which is half of the image signal for one frame is stored in the memory 303. Accordingly, the memory 303 needs only to have a capacity capable of storing an image signal for one field, and even in an arrangement in which, as in the present embodiment, an image signal is inputted at intervals of 1/60 of a second and has the number of pixels which is twice the number of pixels of an image signal obtained from an image pickup element of the previously-described type which updates an image for one frame per 1/30 of a second, it is possible to realize the time-cyclic noise reduction processing without using a memory having an increased capacity.

In addition, in the present embodiment, only half of the pixels included in an input image signal are subjected to the time-cyclic noise reduction processing, but since pixels to be subjected to the noise reduction and pixels not to be subjected to the noise reduction are arrayed in a staggered pattern (at positions which are offset from each other between horizontal lines), it is possible to achieve an effect which is visually substantially the same as when all the pixels are subjected to the noise reduction.

Theoretically, it has been considered that the degree of the effect of the noise reduction applied to half of the pixels is 50% of that of the effect of the noise reduction applied to all the pixels. However, according to actual evaluations by persons using the apparatus of the present embodiment, it has been found out that the noise reduction of the present embodiment has an effect equivalent to approximately 70–80% of the effect of the noise reduction applied to all the pixels. The reason for this seems to be that the inherent visual sensation of a human is less sensitive to a density variation in an oblique direction than in a horizontal or vertical direction.

As described above, in the present embodiment, it is possible to effectively reduce the noise component of an image signal obtained from the progressive scanning type of image pickup element, without using a memory having an increased capacity. However, in the present embodiment, the noise reduction effect is further enhanced by providing an NR filter 40 which will be described later.

The NR filter 40 will be described below.

Figure 5:
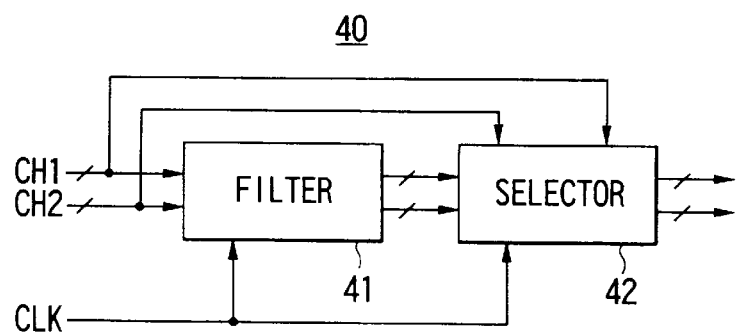
FIG. 5 is a block diagram showing the arrangement of the NR filter shown in FIG. 1.

FIG. 5 is a block diagram showing the arrangement of the NR filter 40. As shown in FIG. 5, the NR filter 40 includes a filter 41 and a selector 42, and performs noise reduction processing by predicting a noise component of the signal TRU, as will be described later.

Figure 6:
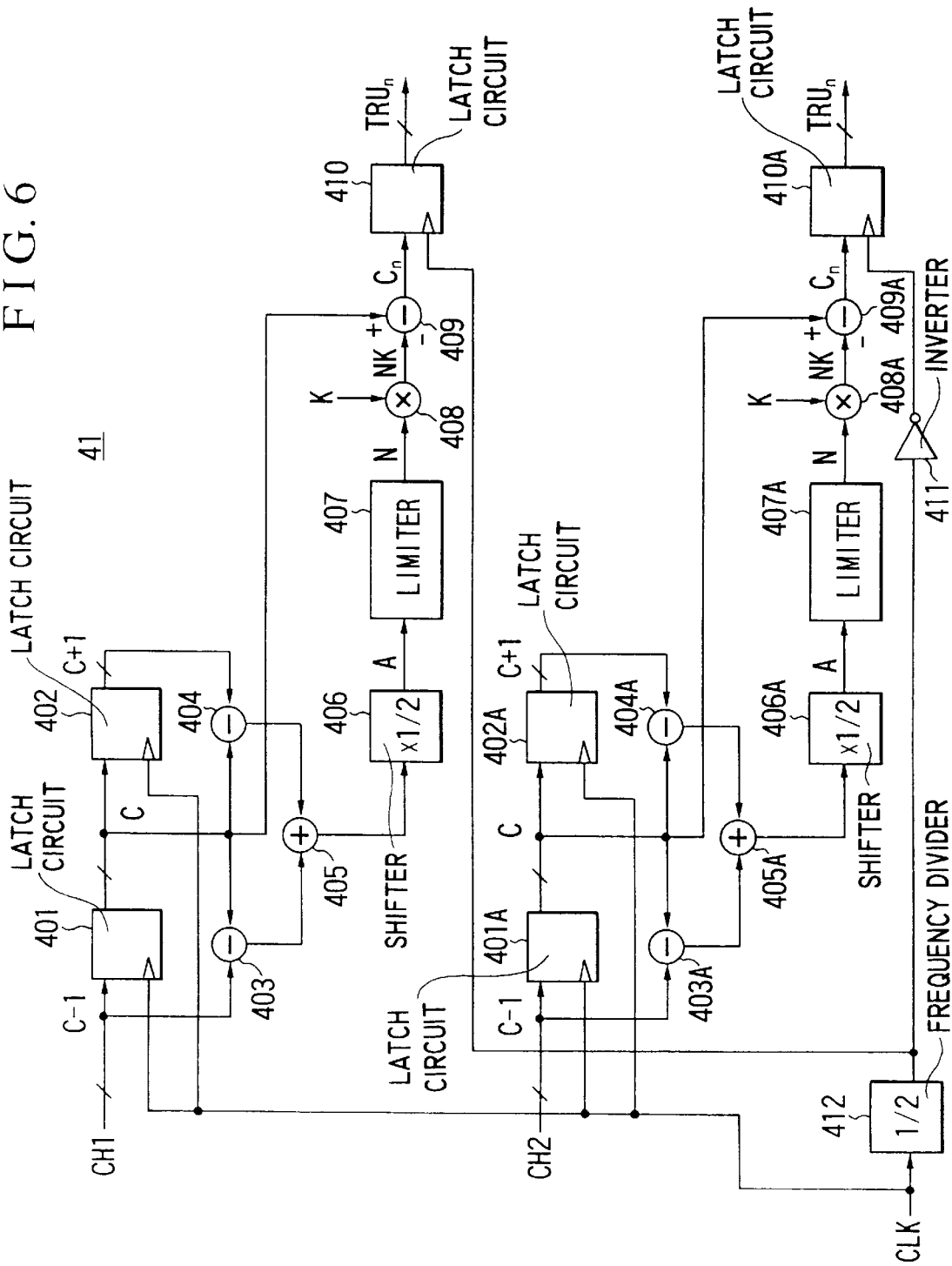
FIG. 6 is a block diagram showing the arrangement of the filter shown in FIG. 5.

FIG. 6 is a block diagram showing the arrangement of the filter 41 shown in FIG. 5. The filter 41 is composed of two processing parts for the two channels CH1 and CH2.

The image signal on the channel CH1, which is outputted from the combining circuit 20, is latched by a latch circuit 401 on a pixel-by-pixel basis as described previously, and the output of the latch circuit 401 is latched by a latch circuit 402, so that signals C−1 and C+1 indicative of pixels positioned before and after a pixel C outputted from the latch circuit 401 are generated.

Figure 7:
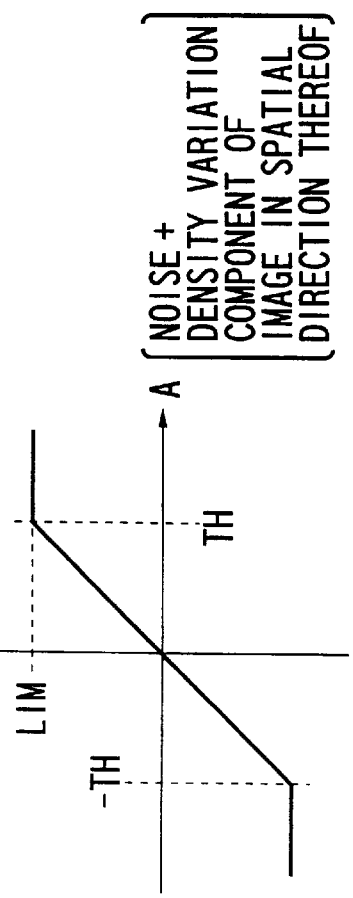
FIG. 7 is a view aiding in explaining the operation of the circuit shown in FIG. 6.
Figure 7:
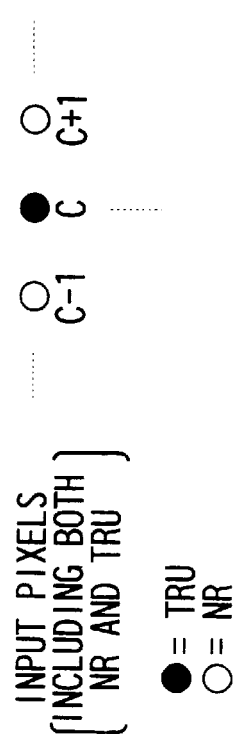

Then, the three pixel signals C−1, C and C+1 as well as subtracters 403 and 404, an adder 405 and a shifter 406 are employed to calculate a "noise plus density variation component of image in spatial direction thereof" A which is shown in FIG. 7. FIG. 7 will be described later.

The "noise plus density variation component of image in spatial direction thereof" A is outputted to a limiter 407, in which a pure noise component N is extracted. The noise component N is multiplied by an appropriate coefficient K in a multiplier 408, and a final noise component NK is outputted to a subtracter 409. The subtracter 409 subtracts the noise component NK from the input signal C and obtains a signal $C_n$ whose noise component is newly reduced. The signal $C_n$ is outputted to a latch circuit 410.

The signal $C_n$ is latched by the latch circuit 410 in accordance with a clock obtained by dividing the frequency of the pixel clock CLK by two by means of a frequency divider 412, and the latched signal is outputted from the latch circuit 410.

The reason why the signal $C_n$ is latched by the latch circuit 410 in accordance with the clock obtained by dividing the pixel clock CLK by two is that, as described above, the image signal from the combining circuit 20 includes the signal $NR_n$ subjected to the NR processing and the signal TRU separated by the separating circuit 10 and not subjected to the NR processing in such a manner that the signal $NR_n$ and the signal TRU appear alternately from pixel to pixel. By latching the signal $C_n$ by the latch circuit 410 every other clock in accordance with the pixel clock CLK, only a pixel signal corresponding to the signal TRU included in the output signal of the combining circuit 20 is latched and outputted.

The period (timing) at which a signal corresponding to the signal $NR_n$ and a signal corresponding to the signal TRU appear in the image signal on the channel CH2 is deviated by one clock from such period in the image signal on the channel CH1. Accordingly, after processing similar to the above-described processing for the channel CH1 has been performed, the signal $C_n$ is latched by a latch circuit 410A in accordance with a clock which is phase-inverted with respect to the clock used in the latch circuit 410.

The principle of the operation of the filter 41 will be described below with reference to FIG. 7.

In the following description, it is assumed that the above-described three pixel signals C-1, C and C+1 which continuously appear on one line are inputted to the filter 41 and each of the signals C-1 and C+1 is a signal subjected to the NR processing in the NR circuit 30, i.e., a signal corresponding to the signal $NR_n$.

The feature of the filter 41 of the present embodiment is to reduce the noise component of an input signal which contains noise, by making use of the fact that if both a signal which is locally noise-reduced and a signal which contains noise are included as described above, a local noise component at that location can be predicted from the difference value between both signals.

In other words, in the present embodiment, to predict such local noise, the difference between a noise-containing input signal and its left-side adjacent noise-reduced pixel signal and the difference between the noise-containing input signal and its right-side adjacent noise-reduced pixel signal are calculated, and the average of the obtained differences is extracted as the "noise plus density variation component of image in spatial (rightward and leftward) direction thereof" A.

Then, the pure noise component N is extracted from the thus-obtained "noise plus density variation component of image in spatial (rightward and leftward) direction thereof" A by a limiter.

If the value A is less than a threshold TH, the limiter determines that the value A is a noise component itself and the noise component N is equal to the value A. If the value A is greater than the threshold TH, the limiter determines that a component not less than the threshold TH is a density variation in a spatial direction, and outputs a preset limit value LIM as the noise component N.

Finally, by subtracting the thus-obtained noise component N from the input signal C corresponding to the signal TRU not subjected to the NR processing by the NR circuit 30, a noise-reduced signal $TRU_n$ can be obtained even from the signal not subjected to the NR processing by the NR circuit 30.

The image signal $TRU_n$ whose noise component is reduced by the filter 41 and the signal corresponding to the signal $NR_n$ on each of the channels CH1 and CH2, which has been outputted from the combining circuit 20, are selected alternately on a pixel-by-pixel basis by a selector 42 and outputted from the selector 42.

An actual evaluation was made as to the NR processing applied to the output of the combining circuit 20 by the NR filter 40. From the evaluation, it has been found out that the effect of the NR processing by the NR filter 40 is approximately 90% of the effect of the time-cyclic noise reduction applied to all the pixels.

In other words, it is possible to achieve a far higher noise reduction effect than the effect of the noise reduction processing using only the NR circuit 30.

As described above, in the present embodiment, since the input image signal is separated into two signals and either one of them is subjected to the time-cyclic NR processing, the required memory capacity can be made small compared to the art of applying the time-cyclic NR processing to all the pixels of the input image signal.

In addition, since sampling is effected in a staggered pattern during the processing of separating pixels to be subjected to the time-cyclic NR processing from pixels not to be subjected to the time-cyclic NR processing, it is possible to reduce the required memory capacity and to minimize a lowering in the noise reduction effect.

In addition, if the noise components of pixels not subjected to the time-cyclic NR processing are detected and reduced by using an NR filter at a stage posterior to the time-cyclic NR processing, it is possible to enhance the noise reduction effect to a further extent without increasing the required circuit scale.

Figure 8:
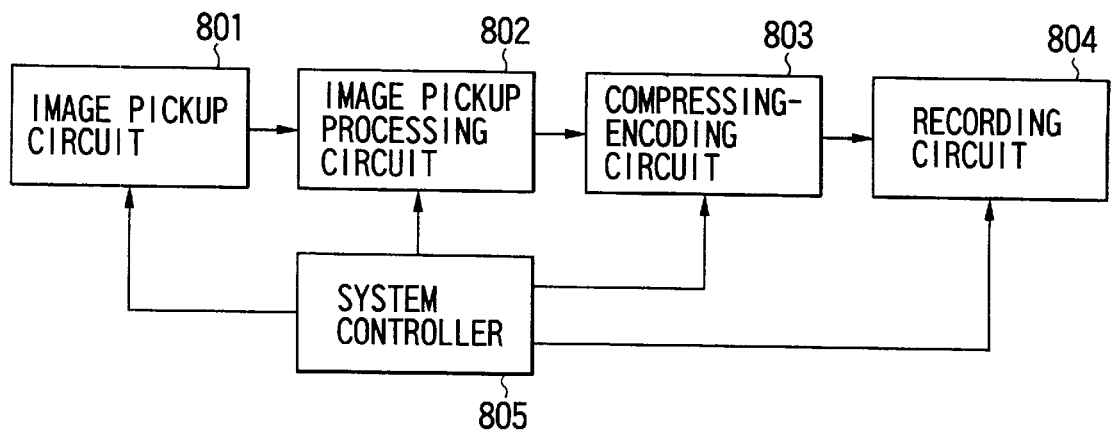
FIG. 8 is a block diagram showing the arrangement of a digital VTR which employs the apparatus shown in FIG. 1.

FIG. 8 is a block diagram showing an example of the arrangement of a camera-integrated type digital VTR which employs the signal processing apparatus shown in FIG. 1.

Referring to FIG. 8, a digital image signal obtained from an image pickup circuit 801 which has the aforesaid progressive scanning type of image pickup element (the image pickup element disclosed in Japanese Patent Application No. Hei 7-280879 may be used) is outputted to an image pickup processing circuit 802. The image pickup processing circuit 802 has an arrangement similar to that of the apparatus shown in FIG. 1, and reduces the noise of the picked-up image signal and outputs the obtained digital image signal to a compressing-encoding circuit 803. The compressing-encoding circuit 803 compresses the amount of information of the digital image signal outputted from the image pickup processing circuit 802, by employing well-known block encoding, and outputs the obtained image signal to a recording circuit 804. The recording circuit 804 adds an error-correcting code, an ID signal and the like to the image signal outputted from the compressing-encoding circuit 803, and records the obtained signal on a magnetic tape by using a rotary head.

A system controller 805 generates driving signals (each including the above-described pixel clock CLK) for the image pickup circuit 801 and the image pickup processing circuit 802, and outputs the driving signals to the respective circuits 801 and 802 and controls them.

Although the above description of the present embodiment has referred to the case in which image signals on two channels obtained from an image pickup element are subjected to NR processing, it is similarly possible to apply the NR processing to other kinds of signals, for example, an HD signal inputted from the outside or an image signal reproduced from a recording medium.

Figure 9:
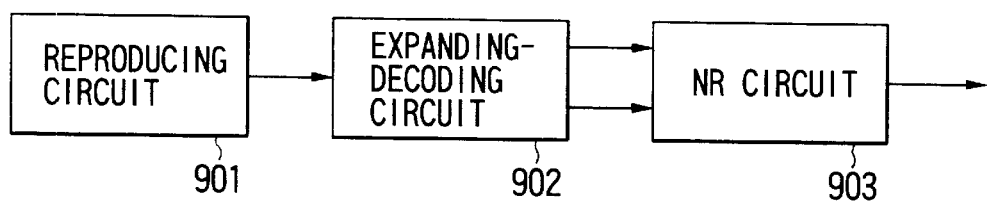
FIG. 9 is a block diagram showing the arrangement of a reproducing apparatus which employs the apparatus shown in FIG. 1.

FIG. 9 is a block diagram showing the arrangement of an apparatus for applying NR processing to an image signal reproduced from a recording medium, by using the apparatus shown in FIG. 1.

Referring to FIG. 9, a reproducing circuit 901 reproduces a digital image signal from a magnetic tape and separates an ID signal and the like from the reproduced digital image signal, and corrects the error of a reproduced image signal by using parity data added during recording.

The digital image signal outputted from the reproducing circuit 901 is decoded and expanded by an expanding-decoding circuit 902, and the obtained signal whose amount of information is expanded is outputted to an NR circuit 903. The NR circuit 903 is a circuit similar to the apparatus shown in FIG. 1, and reduces and outputs the noise of the reproduced image signal in the manner described previously.

Although in the above-described embodiment sampling is performed in a spatially staggered pattern, sampling may be performed in other patterns, for example, in a temporally staggered pattern.

Figure 10:
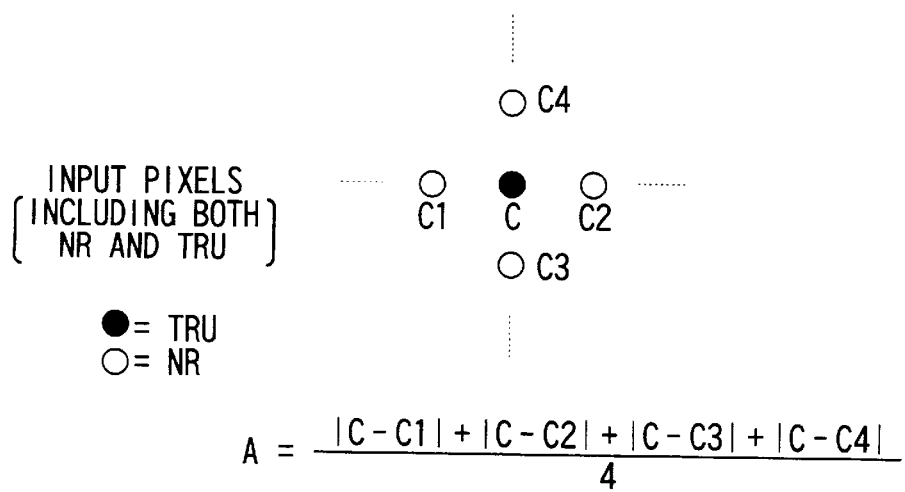
FIG. 10 is a view aiding in explaining another example of the circuit shown in FIG. 5.

In the above-described embodiment, to predict a noise component, the NR filter is employed to obtain the differences between a noise-containing pixel signal and its right- and left-side adjacent pixel signals. However, as shown in FIG. 10 by way of example, the average of the differences between a noise-containing pixel signal and four top, bottom, right and left adjacent pixel signals may be employed.

Although in the above-described embodiment the noise reduction processing is applied to an image signal, the present invention is not limited to only the above-described embodiment and can also be applied to noise reduction processing for an audio signal.

As is apparent from the foregoing description, an input signal is separated into a first signal and a second signal, and the first signal, after having been subjected to time-cyclic noise reduction processing, is combined with the second signal. Accordingly, even if the amount of information of an input signal increases, it is possible to reduce the noise component of the input signal without enlarging the required circuit scale.

What is claimed is:

1. An image signal processing apparatus, comprising:

separating means for separating an input image signal into a first image signal and a second image signal, said separating means including sampling means for obtaining the first image signal by sampling the input image signal at a first timing and for obtaining the second image signal by sampling the input image signal at a second timing different from the first timing;

noise reducing means having a memory and arranged to apply noise reduction process to the first image signal by using the memory; and combining means for combining the first image signal processed by said noise reducing means and the second image signal supplied from said separating means.

2. An apparatus according to claim 1, wherein said memory stores the first image signal for one picture, and wherein said noise reducing means includes means for obtaining a difference signal indicative of a difference between the first image signal and an image signal read out from said memory, a multiplier for multiplying the difference signal by a predetermined coefficient, and a subtracter for subtracting an output of said multiplier from the first image signal, said memory storing an output of said subtracter.

3. An apparatus according to claim 1, wherein the first image signal and the second image signal are signals corresponding to pixels arrayed in a staggered pattern at positions at positions which are offset from each other between horizontal lines in the input image signal.

4. An apparatus according to claim 1, wherein the first image signal and the second image signal are signals corresponding to pixels present at positions offset from each other between two adjacent horizontal lines in the input image signal.

5. An apparatus according to claim 1, further comprising image pickup means for generating the input image signal.

6. An apparatus according to claim 5, wherein said image pickup means outputs in parallel an odd-line image signal and an even-line image signal in one picture, and said separating means receives, as the input image signal, in parallel the odd-line image signal and the even-line image signal outputted from said image pickup means.

7. An apparatus according to claim 1, further comprising reproducing means for reproducing an image signal from a recording medium, said separating means receiving as the input image signal the image signal reproduced by said reproducing means.

8. An apparatus according to claim 1, wherein said separating means separates the input image signal into the first image signal and the second image signal at a predetermined period.

9. An apparatus according to claim 1, wherein said sampling means obtains the first image signal and the second image signal by sampling the input image signal alternately on a pixel-by-pixel basis.

10. A noise reducer, comprising:

separating means for separating an input image signal into a first image signal and a second image signal;

first noise reducing means having a memory and arranged to apply noise reduction processing of a time-cyclic type to the first image signal by using said memory;

second noise reducing means for detecting a noise component of the second image signal by using the second image signal and the first image signal to which the noise reduction processing has been applied by said first noise reducing means, and for applying noise reduction processing to the second image signal by using the detected component of the second image signal; and combining means for combining the first image signal to which the noise reduction processing has been applied by said first noise reducing means and the second image signal to which the noise reduction processing has been applied by said second noise reducing means.

11. A noise reducer according to claim 10, wherein the first image signal and the second image signal are signals corresponding to pixels arrayed in a staggered pattern at positions at positions which are offset from each other between horizontal lines in the input image signal.

12. A noise reducer according to claim 11, wherein said second noise reducing means obtains a difference between the second image signal corresponding to a predetermined pixel and the first image signal corresponding to a pixel adjacent to the predetermined pixel, and detects the noise component of the second image signal by using the difference.

13. A noise reducer according to claim 10, wherein the first image signal and the second image signal are signals corresponding to pixels present at positions offset from each other between two adjacent horizontal lines in the input image signal.

14. An apparatus according to claim 10, wherein said separating means includes sampling means for obtaining the first image signal by sampling the input image signal at a first timing and for obtaining the second image signal by sampling the input image signal at a second timing different from the first timing.

15. An apparatus according to claim 14, wherein said sampling means obtains the first image signal and the second image signal by sampling the input image signal alternately on a pixel-by-pixel basis.

16. An image signal processing method of reducing noise in an input image signal by employing time-cyclic noise reduction processing, comprising the steps of:

separating the input image signal into a first image signal and a second image signal, said separating step including a step of obtaining the first image signal by sampling the input image signal at a first timing and for obtaining the second image signal by sampling the input image signal at a second timing different from the first timing;

applying the time-cyclic noise reducing processing to only the first image signal in the input image signal; and combining the first image signal processed by said noise reduction step and the second image signal supplied by the separating step.

17. A method according to claim 16, further comprising the step of:

detecting a noise component of the second image signal by using the first image signal and the second image signal, and applying noise reduction processing to the second image signal according to the detected noise component.

18. A method according to claim 16, wherein the time-cyclic noise reduction processing is applied to only pixels obtained by sampling pixels of the input image signal in a staggered pattern.

19. A method according to claim 16, wherein an image signal generated by image pickup means is inputted as the input image signal.

20. A method according to claim 19, wherein said image pickup means outputs in parallel an odd-line image signal and an even-line image signal in one picture, and wherein the odd-line image signal and the even-line image signal are inputted in parallel as the input image signal.

21. A method according to claim 17, wherein said sampling step is a step of obtaining the first image signal and the second image signal by sampling the input image signal alternately on a pixel-by-pixel basis.

22. A signal processing apparatus, comprising:

generating means for receiving an input signal and for generating a first signal and a second signal, said generating means generating the first signal by sampling the input signal at a first timing and generating the second signal by sampling the input signal at a second timing different from the first timing;

a memory;

means for obtaining a difference signal indicative of a difference between the first signal and a signal read from said memory;

multiplying means for multiplying the difference signal by a predetermined coefficient;

subtracting means for subtracting an output of said multiplying means from the first signal, said memory storing an output of said subtracting means; and combining means for combining the output of said subtracting means and the second signal supplied from said generating means.

23. An apparatus according to claim 22, wherein the input signal includes an audio signal.

24. An apparatus according to claim 22, wherein the input signal includes an image signal.

25. An image signal processing apparatus, comprising:

image pickup means for picking up an object image to generate an image signal;

generating means for generating a predetermined image signal from the image signal generated by said image pickup means, said generating means including sampling means for obtaining the predetermined image signal by sampling, at a first timing, the image signal generated by said image pickup means, and for obtaining an image signal other than the predetermined image signal by sampling, at a second timing different from the first timing, the image signal generated by said image pickup means;

noise reducing means having a memory and arranged to apply noise reduction processing to the predetermined image signal generated by said generating means, by using said memory; and combining means for combining the predetermined image signal processed by said noise reducing means and an image signal other than the predetermined image signal supplied from said generating means.

26. An apparatus according to claim 25, further comprising second noise reducing means for receiving an image signal outputted from said combining means and for reducing a noise component of the other image signal by using the predetermined image signal processed by said noise reducing mens in the received image signal.

* * * * *

UNITED STATES PATENT AND TRADEMARK OFFICE
CERTIFICATE OF CORRECTION

PATENT NO. : 6,204,890 B1
DATED : March 20, 2001
INVENTOR(S) : Kitahiro Kaneda

It is certified that error appears in the above-identified patent and that said Letters Patent is hereby corrected as shown below:

<u>Column 10,</u>
Line 1, delete "17" and insert -- 16 --.

Signed and Sealed this

First Day of January, 2002

Attest:

JAMES E. ROGAN
*Director of the United States Patent and Trademark Office*

*Attesting Officer*